Aug. 3, 1937.   R. SCHWARZ   2,088,930
STIFFENED FELT HAT
Filed June 2, 1933
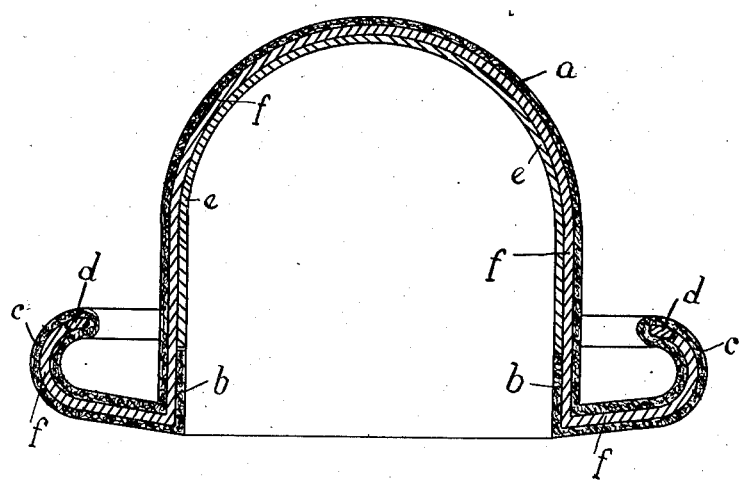
INVENTOR
RICHARD SCHWARZ
BY
Richards & Geier
ATTORNEYS Patented Aug. 3, 1937

2,088,930

UNITED STATES PATENT OFFICE 2,088,930

STIFFENED FELT HAT

Richard Schwarz, Vienna, Austria

Application June 2, 1933, Serial No. 673,962
In Austria June 2, 1932

3 Claims. (Cl. 2—192)

This invention relates to improvements in felt hats, and consists essentially in uniting an outer layer of felt to an inner layer, which may consist of felt, silk, fabric, or the like, by vulcanization with a rubber solution containing sulphur. Either the entire hat or the crown portion alone can be involved.

This method of manufacture effectually prevents the felt from becoming brittle, and from cracking in consequence of being impressed and indented, in the case of stiff hats. Further advantages of the hat according to the present invention are, in the first place, that the two layers of the hat do not tend to become separated from each other under the action of dampness, and finally, that all further apparatus in connection with the hat can be dispensed with.

In the accompanying drawing an example of a felt hat in accordance with the invention is shown in transverse section.

Referring to the drawing a denotes the crown portion of the felt stump, and b the edge portion of the stump which, in the case of the practical example shown, can also be bent over round a steel hoop d and then folded over inwards for the formation of the brim c. Adjoining the edge of this inverted stump there is provided the second, inner felt, silk, or fabric layer e of the crown of the hat. The two layers are united by means of a rubber solution f containing sulphur applied between them, this solution being subsequently vulcanized in a mold.

The application of the rubber solution can be effected by fitting either the inner or the outer layer of the crown of the hat with the brim portion over the hat-block, and then spreading or spraying the rubber solution over the surface. The second layer is then placed or squeegeed into position on the first, after which the vulcanization is carried out on the block at a temperature suitable to the hat material employed.

In the case of hats of different degrees of stiffness or for soft hats there is employed rubber or caoutchouc having a suitable sulphur content.

I claim:

1. In a process of manufacturing a stiffened felt hat of the "Derby" type on a block, the steps of forming at least the crown portion of the hat by shaping a layer of soft felt over the said block in a known manner, then applying a coating of rubber solution containing sulphur to the outside of the said layer while on the block, placing a second layer of soft felt upon the thus coated first layer, pressing the said two layers together so that the intervening rubber solution penetrates into both the said layers, thereafter stiffening the two-layer soft structure thus formed by vulcanizing the said rubber solution by the application of heat and pressure to the said layers while still in position on the block, and finally removing the stiffened structure from the block.

2. A two-layer hat construction produced in accordance with claim 1.

3. A two-layer stiffened felt hat construction of the "Derby" type consisting of two layers of soft felt which have been substantially integrally united together and stiffened by an intermediate layer of rubber partly incorporated with the adjacent portions of the said two layers of soft felt and vulcanized in situ, the said hat being resiliently flexible and capable of being indented and restored to its original shape without marking or cracking, and the said two layers of felt being resistant to separation even when subjected to adverse conditions of dampness and humidity.

RICHARD SCHWARZ.